(12) United States Patent
Roychowdhury

(10) Patent No.: US 7,370,033 B1
(45) Date of Patent: May 6, 2008

(54) METHOD FOR EXTRACTING ASSOCIATION RULES FROM TRANSACTIONS IN A DATABASE

(75) Inventor: Shounak Roychowdhury, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 765 days.

(21) Appl. No.: 10/146,937

(22) Filed: May 17, 2002

(51) Int. Cl.
*G06F 17/30* (2006.01)

(52) U.S. Cl. .................. 707/3; 707/1; 707/4; 707/6; 707/100; 715/500

(58) Field of Classification Search ........ 707/100–102, 707/3–4, 200, 1, 6; 715/500
See application file for complete search history.

(56) References Cited

U.S. PATENT DOCUMENTS

| | | | |
|---|---|---|---|
| 5,758,147 A * | 5/1998 | Chen et al. ...................... | 707/6 |
| 5,819,266 A * | 10/1998 | Agrawal et al. ................ | 707/6 |
| 6,301,575 B1 * | 10/2001 | Chadha et al. ................. | 707/2 |
| 6,360,224 B1 * | 3/2002 | Chickering ................. | 707/100 |
| 6,415,287 B1 * | 7/2002 | Wang et al. ................... | 707/6 |
| 6,651,049 B1 * | 11/2003 | Agrawal et al. ............... | 707/2 |
| 6,735,589 B2 * | 5/2004 | Bradley et al. ................ | 707/6 |
| 6,768,986 B2 * | 7/2004 | Cras et al. ..................... | 707/2 |
| 7,028,250 B2 * | 4/2006 | Ukrainczyk et al. ......... | 715/500 |
| 2002/0038306 A1 * | 3/2002 | Griffin et al. ............... | 707/101 |

OTHER PUBLICATIONS

W. H. Payne: "Combination Generators" Jun. 1979, Communication of the ACM, vol. 5, Issue 2, pp. 163-172.*
Charles Mifsud: "Algorithm 154: Combination in Lexicographical Order" Mar. 1963, Communication of the ACM, vol. 6, p. 103.*

* cited by examiner

*Primary Examiner*—Don Wong
*Assistant Examiner*—Sheree N Brown
(74) *Attorney, Agent, or Firm*—Hickman Palermo Truong & Becker LLP

(57) ABSTRACT

Apriori algorithms are popular data mining techniques for extracting association rules from a body of data. The computational complexity of these algorithms is reduced by representing itemset information at cells of a hypercube. The cells encode associations between the items of each transaction. Direct computation of a cell as a lexicographic combination of items accelerates the computation of itemsets, and thereby improves the computational runtime complexity of the apriori algorithm that discovers association rules. Even faster computation is achieved by a user selected cardinality that limits the maximum size of the itemsets.

23 Claims, 6 Drawing Sheets

|    | C1 | C2 | C3 | C4 | C5 |
|----|----|----|----|----|----|
| C1 |    | 0  | 1  | 0  | 1  |
| C2 |    |    | 2  | 1  | 2  |
| C3 |    |    |    | 1  | 3  |
| C4 |    |    |    |    | 1  |
| C5 |    |    |    |    |    |

FIG. 6

|    | C1 | C2  | C3  | C4  | C5  |
|----|----|-----|-----|-----|-----|
| C1 |    | 0   | 0.3 | 0   | 0.3 |
| C2 |    |     | 0.7 | 0.3 | 0.7 |
| C3 |    |     |     | 0.3 | 1.0 |
| C4 |    |     |     |     | 0.3 |
| C5 |    |     |     |     |     |

FIG. 7

(BACKGROUND)

METHOD FOR EXTRACTING ASSOCIATION RULES FROM TRANSACTIONS IN A DATABASE

FIELD OF THE INVENTION

The present invention relates to database mining and more particularly to a method for extracting association rules.

BACKGROUND OF THE INVENTION

Useful and previously unknown information can be discovered by mining databases. This new information can aid in critical analysis and decision making process. However, due to extensive computation that is often performed during the data mining process, the temporal complexity of data mining algorithms has been the key research issue. In the past several years, researchers have extensively focused on the development of new algorithms that yield faster and better performance.

An important application of data mining is market-basket analysis. For instance, online stores analyze their customers' online behavior and buying patterns data to offer and market other products and goods that the customers would likely be interested in. The stream of clicks through the store ("clickstream") is logged into a data warehouse and analyzed to discover information that can be used to target marketing to the customer.

For example, a hypothetical online bookseller may wish to analyze which of its books are popular, which books correlate better with which category, and which books are often bought with what other items. To illustrate this scenario, let us suppose that a user has bought several different books within a particular time period, including "Object-Oriented Data Warehouse Design," "Tools for statistical inference," "Bayesian methods, Bayes, and Empirical Bayes: Methods for Data Analysis," "A joke book on Windows," "Indian cooking," "Data mining in Java," and "The Art of Japanese prints."

In this example, the bookstore finds from the buying pattern of purchasing two books on data analysis and a data warehouse related book, that that the books "Tools for statistical inference" and "Bayesian methods, Bayes, and Empirical Bayes: Methods for Data Analysis" are closely related from the perspective of data mining. On the other hand, the "Object-Oriented Data Warehouse Design" is also related to data mining. Thus, the topic of data mining is an important aspect of the user's previous transactions. Therefore, next time when the user visits the online bookseller, a personalized web page can be displayed to recommend more books to the user.

One way to determine these recommendations is to use association rules to identify a combination of items that occur together with greater frequency than might be expected if the items were independent of one another. In this example, if the topics of "data mining" and "clustering" co-occur relatively more frequently, the following association rules may be in effect: Data Mining$\Rightarrow$Clustering and Clustering$\Rightarrow$Data Mining. In the illustrative scenario, since the user purchased books related to data mining and since the Data Mining$\Rightarrow$Clustering association rule has been discovered for the online bookseller's system, the online bookseller can generate recommendations relating to clustering (e.g., "Clustering Algorithms", "Clustering of Large Data Sets") for the user. Similarly, other topics related to data mining can be discovered to generate new profitability opportunities.

As used herein, an "itemset" refers to a particular combination of items or attributes that co-occur in a database over a given time period. For example, if a user purchased the following books over the past year: "Object-Oriented Data Warehouse Design," "Tools for statistical inference," "Bayesian methods, Bayes, and Empirical Bayes: Methods for Data Analysis," "A joke book on Windows," "Indian cooking," "Data mining in Java," and "The Art of Japanese prints," then every combination of these books would constitute a respective itemset. The "cardinality" of an itemset is the number of items in the itemset.

An association rule is typically denoted by $X \Rightarrow Y$, where X and Y are itemsets. Association rules are not logical implications or actual rules but an encoding of information about associations within itemsets. In other words, association rules indicate the presence and strength of coupling of items within the itemsets, and how itemset correlate among themselves, for a given set of transactions. From a statistical perspective, association rules locate the groups of itemsets that occur quite frequently. The co-occurrence of any particular itemset intuitively suggests that there may be some type (or form) of association or binding that holds a relationship between these items and itemsets together. For market-based analysis, the core idea is not to discover what type of relationship does the transaction database encodes but to figure out those frequent associations among itemsets that may inherently exist within them.

Apriori algorithms are popular data association rule mining techniques. Apriori algorithms use a "downward closure" property, which means so that any subset of frequent itemsets is also considered frequent. For example, if an itemset ABC, which consists of A, B, and Cm is found to be frequent, then all subsets of {A, B, C}, such as {A, B} for itemset AB and {B, C} for itemset BC are also considered frequent. However, apriori algorithms are very computationally expensive.

One example of an apriori algorithm for building association rules from transactional databases, to mine all association rules from a given database with respect to a set of minimal threshold measures, is disclosed in R. Agrawal, H. Mannila, R. Srikant, H. Toivonen, and A. I. Verkamo, "Fast discovery of association rules", Advances in Knowledge Discovery and Data Mining, U. Fayyad, G. Piatetsky-Shapiro, P. Smyth, R. Uthurusamy (Eds.), AAAI Press, Melo Park, Calif., 1996. Since the original proposal of association rules almost ten years ago, the fundamental process of deriving these rules has remained more-or-less the same, with much emphasis placed on finding better performing algorithms. In most of these algorithms, the construction of association rules follows two distinct steps, which are: (1) extraction of frequent itemsets, to find out how many itemsets dominate or influence the data; and (2) generation of association rules from the set of extracted frequent itemsets.

In this approach, the set of minimal threshold measures are called support and confidence. The support measure indicates the frequency of itemsets throughout the database. For example, if an itemset AB had a frequency of occurrence of twenty (20) within fifty (50) transactions, then the support of itemset AB or "Supp(AB)" is computed as 20/50 or 0.40 in frequency-based term. On the other hand, the confidence measure indicates the weight of an association rule as a quotient of the support of the itemset that comprises all the components in the association rule and the support of a subset of the itemset. For example, the confidence of a rule $(AB \Rightarrow C)$ is equal to Supp(ABC)/Supp(AB). These support (Supp) and confidence (Conf) measurements are used in most of the algorithms that extract frequent itemsets and generate association rules There is a long felt need for improving the computational complexity of these algorithms. More specifically, a substantial amount of research has been directed to the efficient extraction of frequent itemsets. FIG. 9 illustrates one approach for extracting frequent itemsets from a database of transaction. This approach involves a number of pass, in which frequent itemsets are identified, first starting at a cardinality of 1 (i.e. one-item itemsets) and increasing the cardinality until no more frequent itemsets can be extracted. This approach concludes by taking the union of all the frequent itemsets found for each level of cardinality.

Specifically, at step 901, the first set of frequent itemsets L(1) is initialized to include all the single items that are adequately supported, e.g. those which exceed a predetermined support value. Step 901 constitutes the first pass, and subsequent passes are controlled by block 903, in which the cardinality parameter K is increased as long as there are frequent itemsets at the previous cardinality.

In each pass, starting at step 905, a set of candidate itemsets C(K) of cardinality K is generated based on the frequent itemsets of the previous cardinality L(K−1). One way to generate the candidate itemsets is to perform a union of two of the frequent itemsets and ignoring any duplicates or any results that have a cardinality larger than the current cardinality K. These candidate itemset are pruned by removing any itemset that has an infrequent subset.

Block 907 controls a loop for scanning the database of transactions. Each transaction T is fetched from the database and each subset S of cardinality K of the items in the transaction T are proceed in a loop controlled by block 909. If the subset S is among the candidates C(K), then the support count for the member S in candidates C(K) is incremented (step 911). To facilitate the lookup of S in candidate C(K), a hash tree or hash set data structure may be employed. After each of the subsets S have been processed, execution loops back to block 907 where another transaction T is fetched from the database and processed in steps 909 and 911.

After all the transactions T in the database have been processed, execution proceeds to step 3, where the frequent members of C(K) are added to L(K), e.g. those which exceed a predetermined support value. Execution then returns back to block 903 where the cardinality is increased for another pass. If none of the members of C(K) are frequent enough (e.g. exceed the predetermined support value), then the loop controlled by block 903 terminates. The result is the union of the frequent itemsets L(K) for all the cardinalities that are processed.

The main shortcoming of this approach is performance. In particular, this approach requires multiple scans over all the transactions in the database. Scanning transactions in the database can be very slow because the database is often too large to be held in memory at one time. Even if the database is partitioned horizontally so that each partition can fit in memory, multiple scans over the transactions in the database are still needed. Sampling techniques such as the Dynamic Itemset Count (DIC) have been proposed to find itemsets using only a few passes over the database.

Therefore, there is a crucial need for improving the performance of determining which sets of items are frequent enough to be used in generating association rules.

SUMMARY OF THE INVENTION

These and other needs are addressed by the present invention, in which only a single pass of the database is needed to extract the frequent itemsets by maintaining a plurality of accumulators, each corresponding to a respective cardinality. During a pass over the database, subsets from each transaction are generated and used to update cumulative count values in each of the accumulators, from which the frequent items can be determined. Because only a single pass over the database is needed, the performance penalty in multiple passes over the database is reduced.

In one embodiment, each accumulator is logically implemented as transactional hypercube of a dimension that corresponds to the accumulator's cardinality. Advantageously, a transactional hypercube can be implemented sparsely, requiring only m-choose-k ($_mC_k$) elements, instead of the much larger $m^k$ number of elements, where m is the number of different items in the database and k is the cardinality of the itemset.

Accordingly, one aspect of the invention is directed to a method and software for extracting frequent itemsets from transactions in a database, in which an accumulator that contains an entry corresponding to an itemset of a given cardinality is initialized. In a single pass over the database, transactions are read from the database and a count of the itemset in the transactions is accumulated at the entry in the accumulator. Whether the itemset is considered frequent is determined based on the accumulated count for the itemset in the accumulator, e.g. by comparing a normalization of the count with a predetermined support value.

Another aspect of the invention relates to a method and software of processing data in a database, by generating a hypercube of at least two dimensions. The hypercube has cells that correspond to sets of items in database records, in which the cardinality of the sets is equal to a dimension of the hypercube. Values are encoded in the cells of the hypercube, which represent occurrences of the sets of items of a record fetched from the database.

Yet another aspect of the invention pertains to method and software for extracting frequent itemsets from transactions in a database that includes receiving a parameter indicating a level of cardinality. A plurality of hypercubes are generated having dimensions that correspond to the cardinalities between 2 and the cardinality the parameter. The hypercubes are initialized to contain an entry corresponding to an itemset of cardinalities equal to the hypercubes' dimensions. In a pass over the database, transactions are read from the database and counts of itemsets in the transactions are accumulated at entries in the hypercubes. Whether the itemsets are frequent is determined based on the accumulated counts in the entries for the itemsets in the hypercubes.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates a two-dimensional transactional hypercube used to accumulate counts of itemsets in accordance with an embodiment of the present invention;

FIG. 7 illustrates a normalized, two-dimensional transactional hypercube of accumulated counts of items based on the accumulator of FIG. 6;

DESCRIPTION OF THE PREFERRED EMBODIMENT

A system, method, and software for extracting association rules are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Transactional Hypercubes

Figure 1:
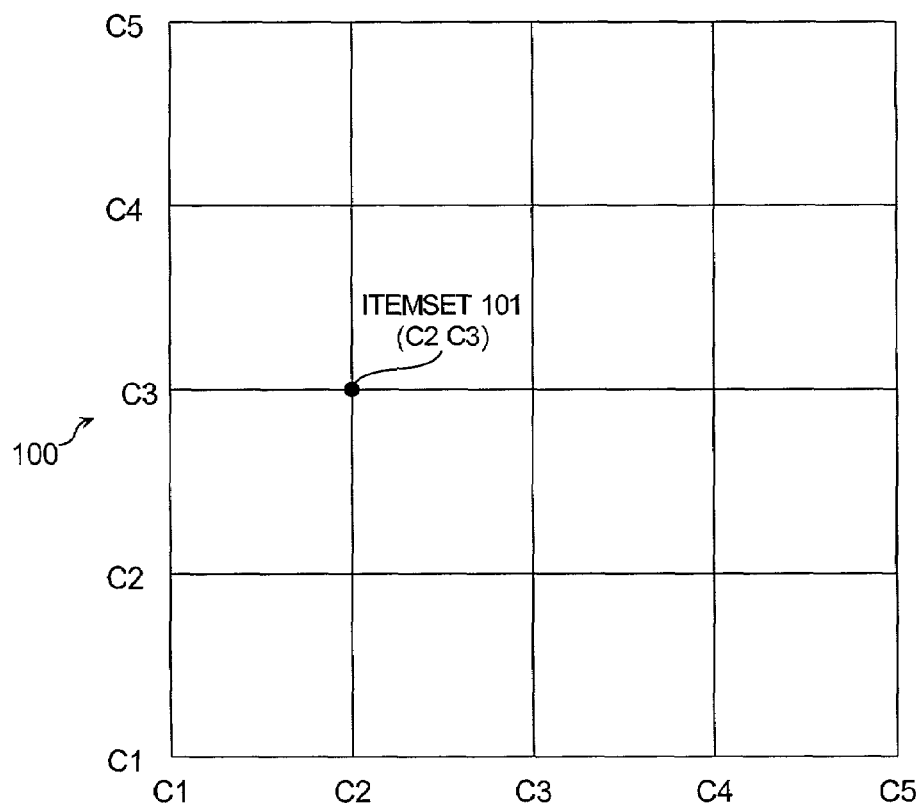
FIG. 1 illustrates a two-dimensional transactional hypercube (i.e. a square), having its cells encoded at the nodes with items as attributes C1 and C4, and its itemset.

A dimension is a direction at right angles to any other dimension. Our visual world has three dimensions (e.g. length, width, and height), and Einstein thought the fourth dimension was time. An N-dimensional hypercube (or polytope) is a geometric object that exists in N dimensions and may be bounded by portions of lines, planes and hyperplanes, and so forth. A two-dimensional hypercube is commonly known as a polygon, of which a square 100 shown in FIG. 1 is an example. A three-dimensional hypercube is also known as a polyhedron, such as a cube 200 of FIG. 2. Higher-dimensional hypercubes are difficult to visualize but can be readily manipulated by computer programs.

Figure 2:
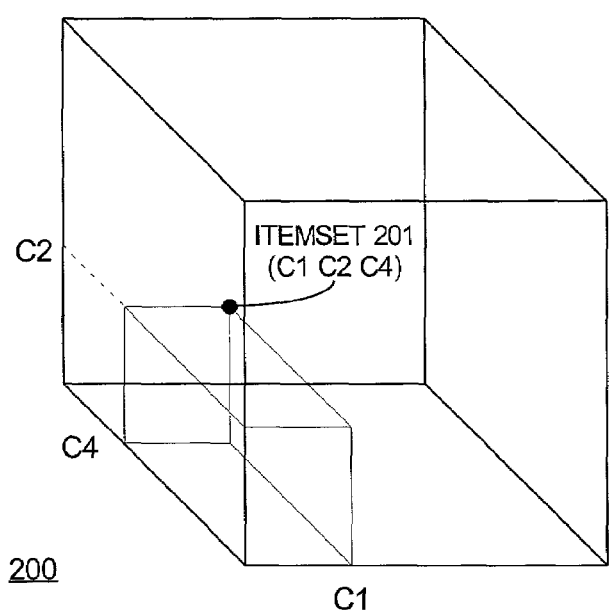
FIG. 2 shows a three-dimensional transactional hypercube M3 (i.e. a cube), having its cells encoded at the nodes with three item attributes C1, C4 and C5, and its itemsets.

In transactional database systems, an attribute set is a collection of the different items that can be found in each transaction. In the example of the online bookseller, each attribute corresponds to particular item that can be purchased. This information can be summarized in a database column by a binary-valued attribute of 0 if none of the particular item was purchased or 1 if at least one of the particular item was purchased. A transactional hypercube is an object in which each dimension spans the attributes in the attribute set. In the example of the online bookseller, one of the attributes along each of the dimensions of a transactional hypercube may hold information as to whether the book "Data Mining in Java" was purchased Items often occur together in a database transaction, and the set of these co-occurring items for one transaction is an itemset. Itemsets can encoded at predetermined locations of the cells in a transactional hypercube. Transactional hypercubes are physically implemented as stored representations encoded on a computable-readable medium. Two transactional hypercubes for a transaction involving items C1, C2, C3, C4, and C5 are illustrated in FIGS. 1 and 2.

A two-dimensional transactional hypercube 100 for representing two-element itemsets in a database having a total of five items C1, C2, C3, C4, and C5 is shown in FIG. 1. A cell 101 in the transactional hypercube 100 encodes the occurrence of an itemset (C1 C4). The presence of the itemset (C1 C4) in the transaction is encoded as a one (1) and the absence of an item in the transaction is encoded as a zero (0). A three-dimensional transactional hypercube 200 is illustrated in FIG. 2, with each of its three dimension having the attributes C1, C2, C3, C4, and C5. This figure is easily recognized as a cube 200. From the above examples and explanation it is seen that, in general, a transactional hypercube M(K), of K dimensions, can encode the presence of K items and encode the occurrence of all combinations or itemsets of these items of a transaction into cells.

A K-dimensional hypercube M(K) can represent all the K-sized itemsets of a transaction by taking a Cartesian product. More specifically, a transactional hypercube M(K) may be defined as the Cartesian product of the attribute set over each dimension of the transactional hypercube M(K). In the example of the two-dimensional hypercube M(2) in FIG. 3, M(2) is defined as the cross product of attribute set {C1, C2, C3, C4, C5} and itself, viz. {C1, C2, C3, C4, C5}. To finish the calculation of the Cartesian product, the attribute values, 0 or 1, are multiplied together and stored in cells of the hypercube. With the binary values of 0 and 1, multiplication acts a logical-and operation. Thus, a 1 will be stored in the hypercube only if all the attributes at that location are 1, i.e. if all the attributes at that location are in the database transaction. In other words, a 1 value stored at a cell indicates that the corresponding attributes are all present in the transaction.

Figure 3:
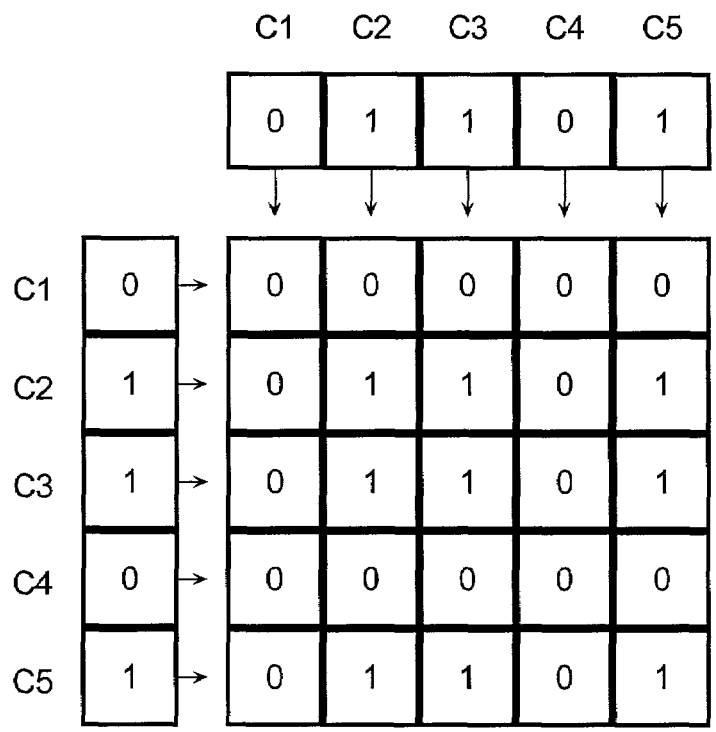
FIG. 3 is a flowchart of extracting frequent itemsets in accordance with one embodiment of the present invention.

Referring to the example of FIG. 3, the two-dimensional hypercube M(2) has been populated with values for a transaction <0, 1, 1, 0, 1> that includes attributes or items C2, C3, and C5 but not attributes C1 and C4. Therefore, C2, C3, and C5 have the value of 1 and C1 and C4 have the value of zero. Cell (C2 C3) stores of the value of 1 because both C2 and C3 are 1 and 1×1=1. On the other hand, cell (C1 C5) stores the value of 0 because C1 is zero and the product of zero and any other number is 0.

Sparse Transactional Hypercubes

Ordinarily, a K-dimensional hypercube of M attributes requires $M^K$ different cells. This number can grow very large very quickly. For example, a 4-dimensional hypercube of 10 attributes would require $10^4$ or 10,000 cells, and a 6-dimensional hypercube of 10 attributes would require a million cells. Thus, it may appear that the use of hypercubes is cost-prohibitive in terms of memory requirements. However, exploitation of the properties of transactions and association rules can significantly decrease the memory requirements of transactional hypercubes.

The diagonal cells at (C1 C1), (C2 C2), etc. can be eliminated because these cells merely encodes self-information, which is useless for formulating association rules. For example, it is trivially true that C1⇒C1, because if a transaction has item C1, it will necessarily have item C1. Furthermore, because itemsets do not specify an order for its elements, itemset (C1 C2) is the same as itemset (C2 C1). By this commutative property, the (C2 C1) can safely be discarded. For these reasons, only M-choose-K ($_MC_K$) cells need to be stored, in which $_MC_K = M!/K!(M-K)!$ and "!" indicates the factorial operation. In hypercubes of dimensions higher than 2, most of the cells can be eliminated, since $_MC_K$ is much less than $M^K$ for K>2. For example, 6-dimensional hypercube of 10 attributes would normally consume memory for 1,000,000 cells, but $_{10}C_6$ is only 210.

A further savings can be obtained by observing that typical transactions do not include many different items. Accordingly, it is likely that most of the attribute values of a transaction will be zero, which means that most of the cells in a K-dimensional hypercube M(K) that represents the K-sized itemsets of a transaction will also be zero. This fact allows for the use of sparse matrix techniques to be implemented, in which memory for only non-zero cells need be allocated. Thus, storage for much of the cell can be eliminated at a cost of a negligible amount of overhead to maintain the sparse data structures.

Figure 4:
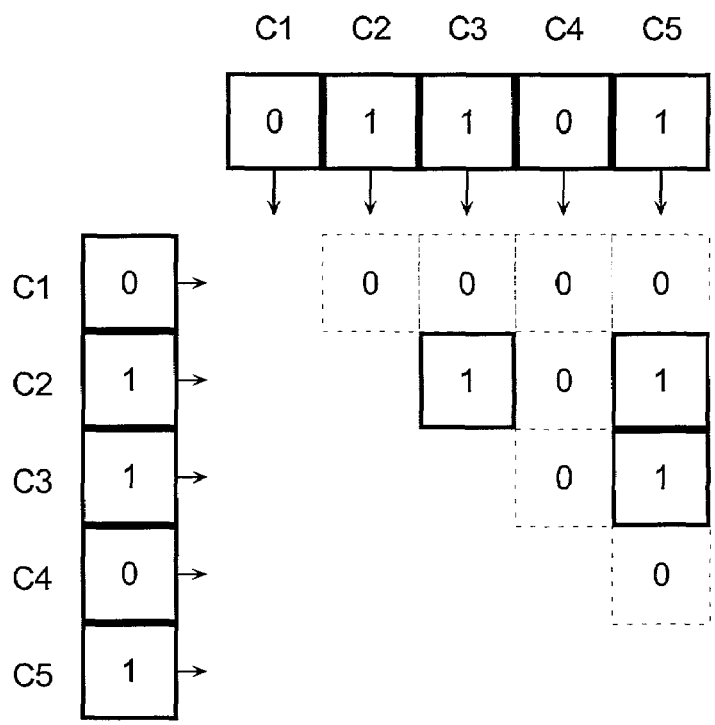
FIG. 4 illustrates a two-dimensional transactional hypercube listing items of a single transaction in accordance with an embodiment of the present invention.

By way of example, a full 2-dimensional hypercube for 5 attributes would require $5^2=25$ cells, as shown in FIG. 3. But, the sparse 2-dimensional transaction hypercube for 5 attributes in FIG. 4 only requires a maximum of $_5C_4=5!/3!2!=10$ cells. For transaction <0, 1, 1, 0, 1> only three cells, at (C2 C3), (C2 C5), and (C3 C5), are non-zero. Thus, out of a total of 25 cells, only 3 cells need to be allocated for this transaction.

Extracting Frequent Itemsets

Figure 5:
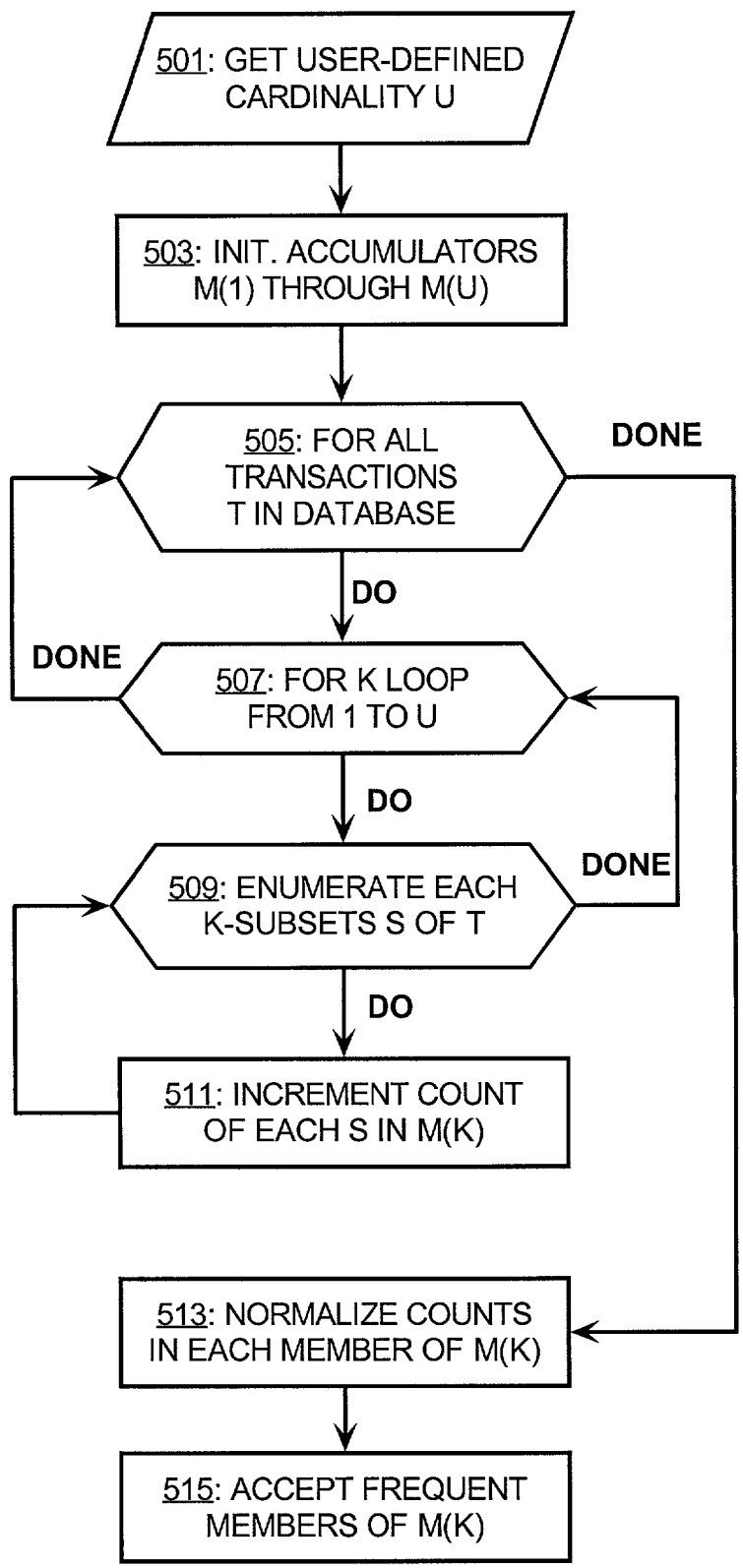
FIG. 5 illustrates a sparse representation for the two-dimensional transactional hypercube according to FIG. 4.

FIG. 5 is a flowchart illustrating the operation of extracting frequent itemsets in accordance with one embodiment of the present invention. At step 501, a user-defined cardinality level parameter U is received. The cardinality level parameter U allows the user control the extraction of associations for a given cardinality of the itemset, in particular, to specify to create association rules from itemsets that have less cardinality than the cardinality of the entire attribute set of the database. For example, in an attribute set of 10 items, the user can specify a cardinality level parameter U of 6. This value of cardinality level parameter U implies that the user is interesting in extracting associations only between six (6) different items.

Most of the apriori algorithms defined in the literature continue until no larger candidate itemsets can be found. Use of the cardinality level parameter U is advantageous over such approaches, because typical transactions have been found not to produce many large itemsets. Thus, the cardinality level parameter U permits the user to specify the maximum reasonable cardinality and discard itemsets of larger cardinality, which require much more computation to be found and which may produce an excessive number of rules.

At step 503, a plurality of accumulators, each corresponding to a respective cardinality from 2 to the cardinality level parameter U is created and initialized to zero. In one embodiment, each accumulator is implemented as a K-dimensional transactional hypercube, in which K ranges from 2 to U. Each cell in the K-dimensional transactional hypercube holds a count of how many times the itemset corresponding to that cell has occurred in transactions of the database. As explained above, the memory requires for each K-dimensional transactional hypercube is at most $_MC_K$ and can be much less when implemented with sparse matrix techniques for typical transactional databases. Accordingly, the memory requirements of this embodiment of the present invention are not cost-prohibitive.

Block 505 controls a loop over which a single pass of the database is made. A single pass over the database is particularly advantageous because it minimizes the input/output operations that are required for fetching data from a database. In the loop controlled by block 505, each transaction T is fetched from the database and execution proceeds to block 507, which loops over each cardinality from 2 to the cardinality level parameter U.

For each cardinality K of loop 507, the K-subsets S of the fetched transaction T is enumerated in step 509. One aspect of the present invention stems from the realization that only a maximum of $_MC_K$ itemsets are stored in K-dimensional transactional hypercube. Accordingly, these cells can be mapped to a lexicographical order-based combination of items within the itemset, because there are exactly $_MC_K$ different lexicographically ordered K-subsets of M items. Efficient algorithms exist for generating a lexicographical order of combinations, and a preferred embodiment of the invention employs Mifsud's algorithm to generate the K-subsets S of the items from the fetched transaction T.

At step 511, the count of the itemset that corresponds to each of the generated K-subsets S of the fetched transaction T is incremented. In one embodiment, Mifsud's algorithm is used to generate successive itemsets in lexicographical order. If the product of the item-attributes is 0, which is usually the case, then there is no need to access the accumulator M(K) to update the count. Thus, the accumulator M(K) is only accessed on the rare occasions that the product of the item-attributes is 1.

After all the subsets have been generated, execution flows back to block 507, where another transaction is fetched from the database. FIG. 6 shows 2-dimensional transactional hypercube accumulator M(2) after three transactions, namely T(1)=<0, 1, 1, 0, 1>, T(2)=<1, 0, 1, 0, 1>, and T(3)=<0, 1, 1, 1, 1>, have been processed. Some of the cells have only been counted once (e.g. cell (C1 C3)), and others have been counted all three times, e.g. cell (C3 C5). Cells (C1 C2) and (C1 C4) still have a zero value and therefore need not be allocated in the sparse matrix representation of the 2-dimensional transactional hypercube accumulator M(2).

When all the transactions in the database have been processed, execution proceeds to step 513, where the counts are normalized by dividing the counts by the number of transactions in the database. In the example of FIG. 6, each of the counts are normalized by dividing by 3, which produces the accumulator shown in FIG. 7. This step allows for a user to pick a percentage value for support without having to know the exact number of transactions in the database. At step 515, the frequent itemset members in each of the accumulators are chosen if their normalized count values exceed the pre-defined support value given by the user. From this point forward, the frequent itemsets extracted in accordance with this embodiment of the present invention may be used in accordance with any technique to compute the appropriate confidence values and, thence, the association rules.

Hardware Overview

Figure 8:
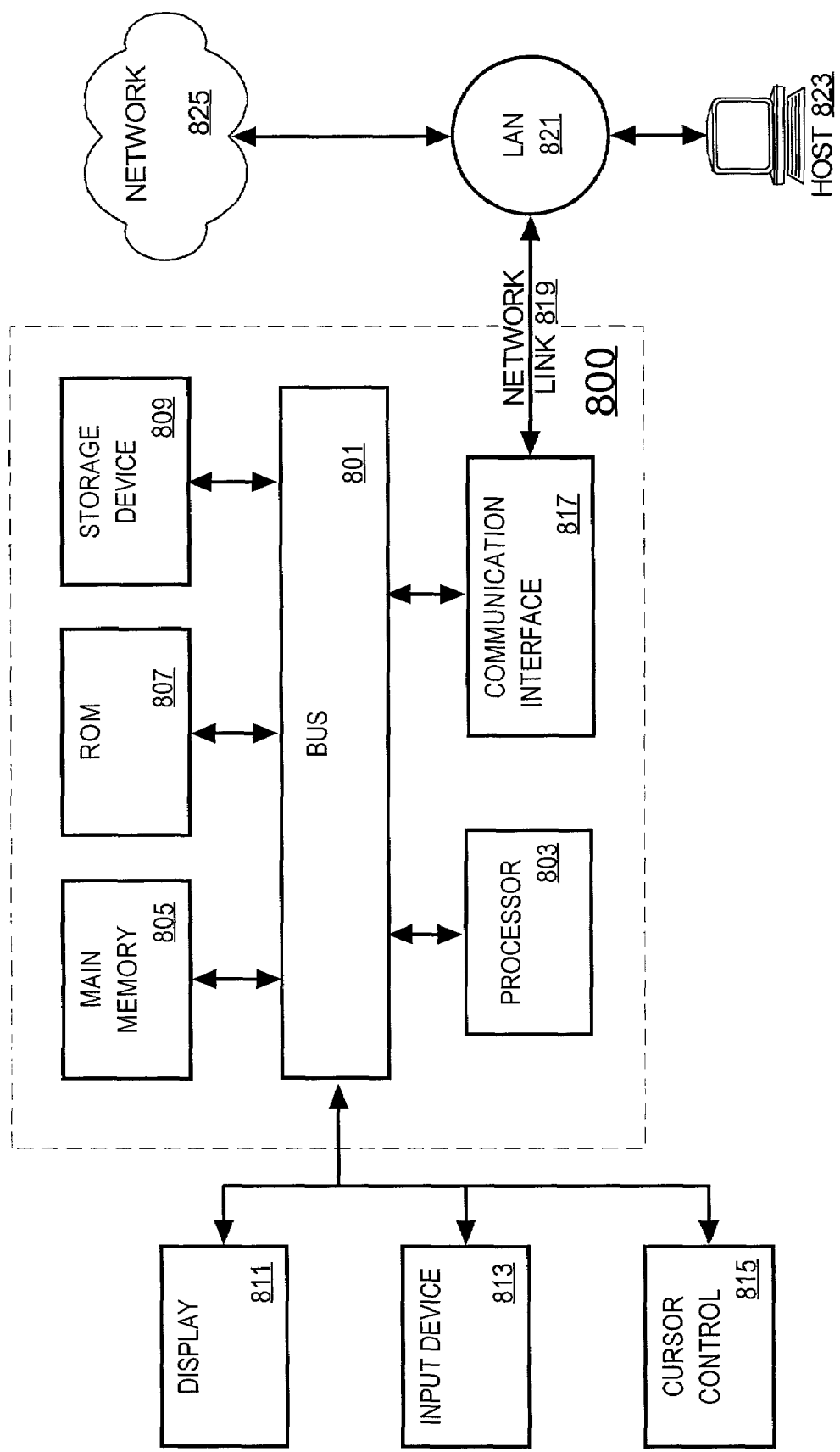
FIG. 8 depicts a computer system implementation of the embodiment of the present invention.
Figure 9:
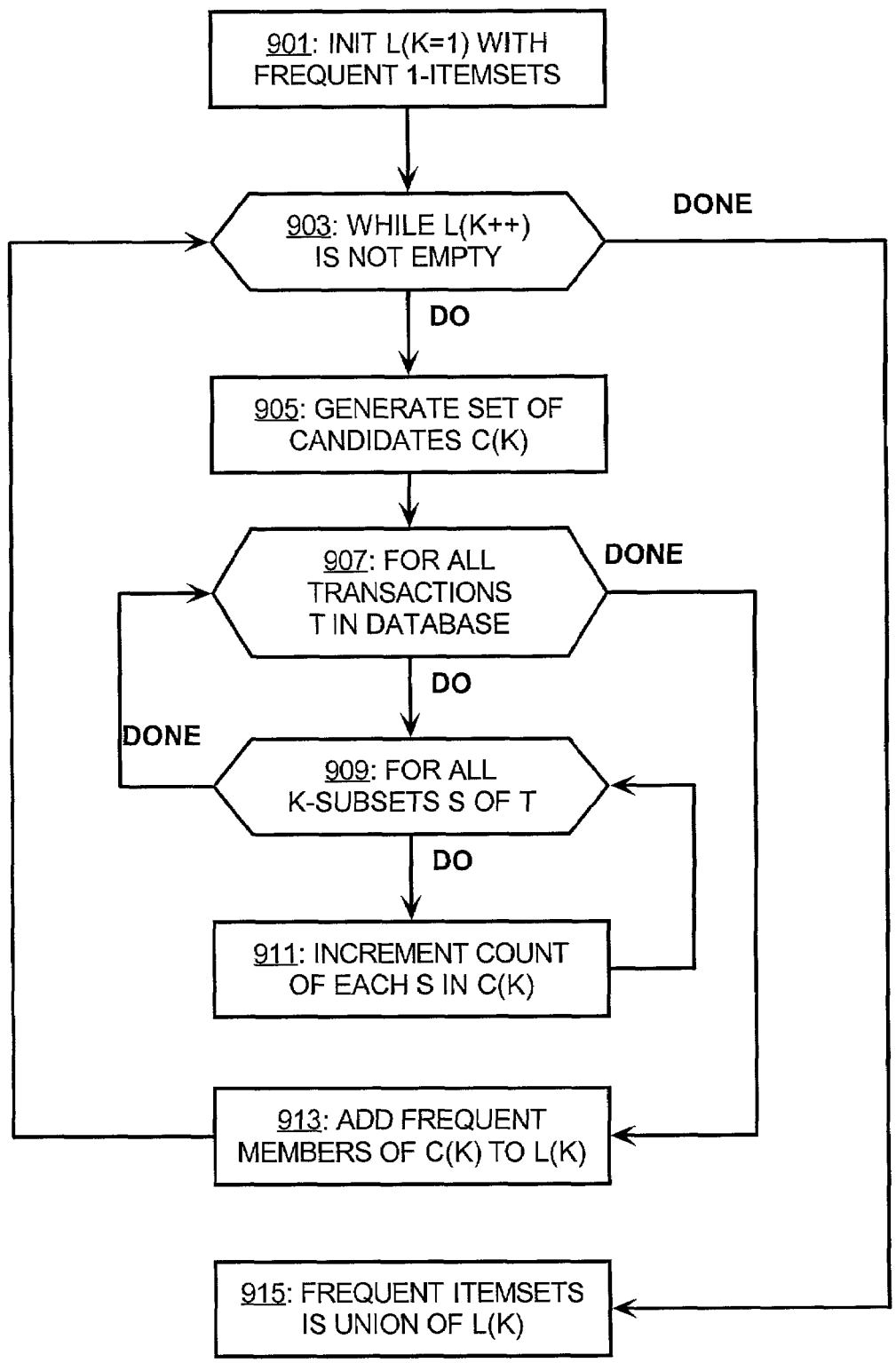
FIG. 9 illustrates a conventional frequent itemset extraction process.

FIG. 8 illustrates a computer system 800 upon which an embodiment according to the present invention can be implemented. The computer system 800 includes a bus 801 or other communication mechanism for communicating information and a processor 803 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, extracting association rules is provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging an application program for implementing an embodiment of the present invention through the network 825, local network 821 and communication interface 817. The processor 803 may execute the transmitted code while being received and/or store the code in storage device 819, or other non-volatile storage for later execution. In this manner, computer system 800 may obtain application code in the form of a carrier wave.

The term "computer-readable medium" as used herein refers to any medium that participates in providing instructions to the processor 805 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

Accordingly, an embodiment of extracting of frequent itemsets is described, which employs the construction of transactional hypercubes of different dimensions simultaneously to accommodate the computation of itemsets of different length, up to a user chosen cardinality. Boolean addition is used to obtain the validity of itemsets and binary addition is used to accumulate the values for frequency of itemsets. Redundant and self itemsets are rejected. Therefore, there is only one database pass for computation of all the frequent itemsets. Cardinality is a new parameter that allows users to restrict the generation of itemsets larger than a certain cardinality.

While specific examples of use of embodiments of the invention have been set forth with respect to database mining, more specifically for the example usage of market-basket analysis, the invention has a more generic usage within the framework of implication rules. For example, in the formation of a medical expert system, as a part of artificial intelligence, each transaction could be a single patient diagnosis, and the itemsets relate to the attributes of symptoms. Because huge data repositories are now efficiently mined, the discovery of latent, useful and previously unknown information in databases becomes practical.

While the present invention has been described in connection with a number of embodiments and implementations, the present invention is not so limited but covers various obvious modifications and equivalent arrangements, which fall within the purview of the appended claims.

What is claimed is:

1. A method for extracting frequent itemsets from transactions in a database comprising:
   initializing a plurality of accumulators;
   wherein each of the plurality of accumulators contains an entry corresponding to an itemset of a respective cardinality;
   wherein each of the plurality of accumulators is implemented as a hypercube of a dimension equal to the respective cardinality of the accumulator;
   in a single scan passing over the database, performing the steps of:
      reading transaction entries from the database; and
      accumulating counts of itemsets in the transaction entries at the entries in the accumulators; and
   determining whether an itemset is frequent based on the accumulated counts in the entries for the itemsets in each of the plurality of accumulators exceeding a particular support value; and
   extracting said frequent itemsets from the transaction entries and storing said frequent itemsets in a database.

2. A method according to claim 1, further comprising:
   implementing the hypercube as a sparse matrix, requiring only m-choose-k (mCk) elements, wherein m is a number of items in the database and k is the cardinality of the itemset.

3. A method according to claim 1, further comprising:
   receiving a parameter indicating a level of cardinality; and
   generating the plurality of accumulators to correspond respectively to the cardinalities between 2 and the level of cardinality indicated by the parameter, inclusively.

4. A method according to claim 1, further comprising:
   in the single scan passing over the database, generating itemsets in a lexicographical order based upon combinations of items present in the transaction.

5. A method according to claim 4, wherein said generating the itemsets in the lexicographical order includes generating the itemsets using Mifsud's algorithm.

6. A method according to claim 1, wherein said determining includes:
   comparing the accumulated count in the entry with a predetermined support value.

7. A method according to claim 1, wherein said determining includes:
   normalizing the accumulated count in the entry based on a number of records fetched from the database; and
   comparing the normalized count in the entry with a predetermined support value.

8. A computer-readable storage medium bearing instructions for extracting frequent itemsets from transactions in a database, said instructions being arranged, upon execution thereof, to cause one or more processors to perform the steps of the method according claim 1.

9. A method of processing data in a database, comprising the steps of:
   generating a hypercube of at least two dimensions and having cells corresponding to sets of items, wherein the sets of items have a cardinality equal to a dimension of the hypercube;
   in a single pass over the database, encoding values representing a total number of occurrences of the sets of items in a record fetched from the database respectively to the cells of the hypercube; and
   determining whether the sets of items are frequent based on the total number of occurrences encoded to the cells of the hypercube exceeding a particular support value; and
   storing said frequent sets of items in a database.

10. A method according to claim 9, further comprising:
    implementing the hypercube as a sparse matrix.

11. A method according to claim 9, further comprising:
    generating the sets of items in a lexicographical order based upon combinations of items present in the record.

12. A method according to claim 11, wherein said generating the sets of items in the lexicographical order includes generating the sets of items using Mifsud's algorithm.

13. A computer-readable storage medium bearing instructions for processing data in the database, said instructions being arranged, upon execution thereof, to cause one or more processors to perform the steps of the method according to claim 9.

14. A method for extracting frequent itemsets from transactions in a database, comprising:
- receiving a parameter indicating a level of cardinality; and
- generating a plurality of hypercubes having respective dimensions to correspond to cardinalities between 2 and the level of cardinality indicated by the parameter inclusively;
- initializing the hypercubes, wherein the hypercubes contain an entry corresponding to an itemset of cardinalities equal to the dimensions of the hypercubes, respectively;
- in a single scan passing over the database, performing the steps of:
  - reading transaction entries from the database; and
  - accumulating counts of itemsets in the transaction entries at entries in the hypercubes; and
- determining whether the itemsets are frequent based on the accumulated counts in the entries for the itemsets in the hypercubes exceeding a particular support value; and
- storing said frequent sets of items in a database.

15. A computer-readable storage medium bearing instructions for extracting frequent itemsets from transactions in a database, said instructions being arranged, upon execution thereof, to cause one or more processors to perform the steps of the method according to claim 14.

16. A method for extracting frequent itemsets from transactions in a database comprising:
- receiving a parameter indicating a level of cardinality;
- initializing a plurality of accumulators;
- wherein each of the plurality of accumulators contains an entry corresponding to an itemset of a certain level of cardinality;
- wherein the level of cardinality for the entry in each of the plurality of accumulators corresponds respectively to the cardinalities between 2 and the level of cardinality indicated by the parameter, inclusively;
- in a single scan passing over the database, performing the steps of:
  - reading transaction entries from the database; and
  - accumulating counts of itemsets in the transaction entries at the entries in the accumulators; and
- determining whether an itemset is frequent based on the accumulated counts in the entries for the itemsets in the accumulator exceeding a particular support value; and
- extracting said frequent itemsets from the transaction entries and storing said frequent itemsets in a database.

17. The method of claim 16, wherein the accumulators are implemented as a hypercube of a dimension equal to the cardinality.

18. A method according to claim 17, further comprising:
- implementing the hypercube as a sparse matrix.

19. A method according to claim 16, further comprising:
- in the single scan passing over the database, generating itemsets in a lexicographical order based upon combinations of items present in the transaction.

20. A method according to claim 19, wherein said generating the itemsets in the lexicographical order includes generating the itemsets using Mifsud's algorithm.

21. A method according to claim 16, wherein said determining includes:
- comparing the accumulated count in the entry with a predetermined support value.

22. A method according to claim 16, wherein said determining includes:
- normalizing the accumulated count in the entry based on a number of records fetched from the database; and
- comparing the normalized count in the entry with a predetermined support value.

23. A computer-readable storage medium bearing instructions for extracting frequent itemsets from transactions in a database, said instructions being arranged, upon execution thereof, to cause one or more processors to perform the steps of the method according claim 16.

* * * * *